Feb. 20, 1934.   G. K. McNEILL   1,948,000
APPARATUS FOR CUTTING AND ASSEMBLING PLIES
Filed March 13, 1928   3 Sheets-Sheet 1
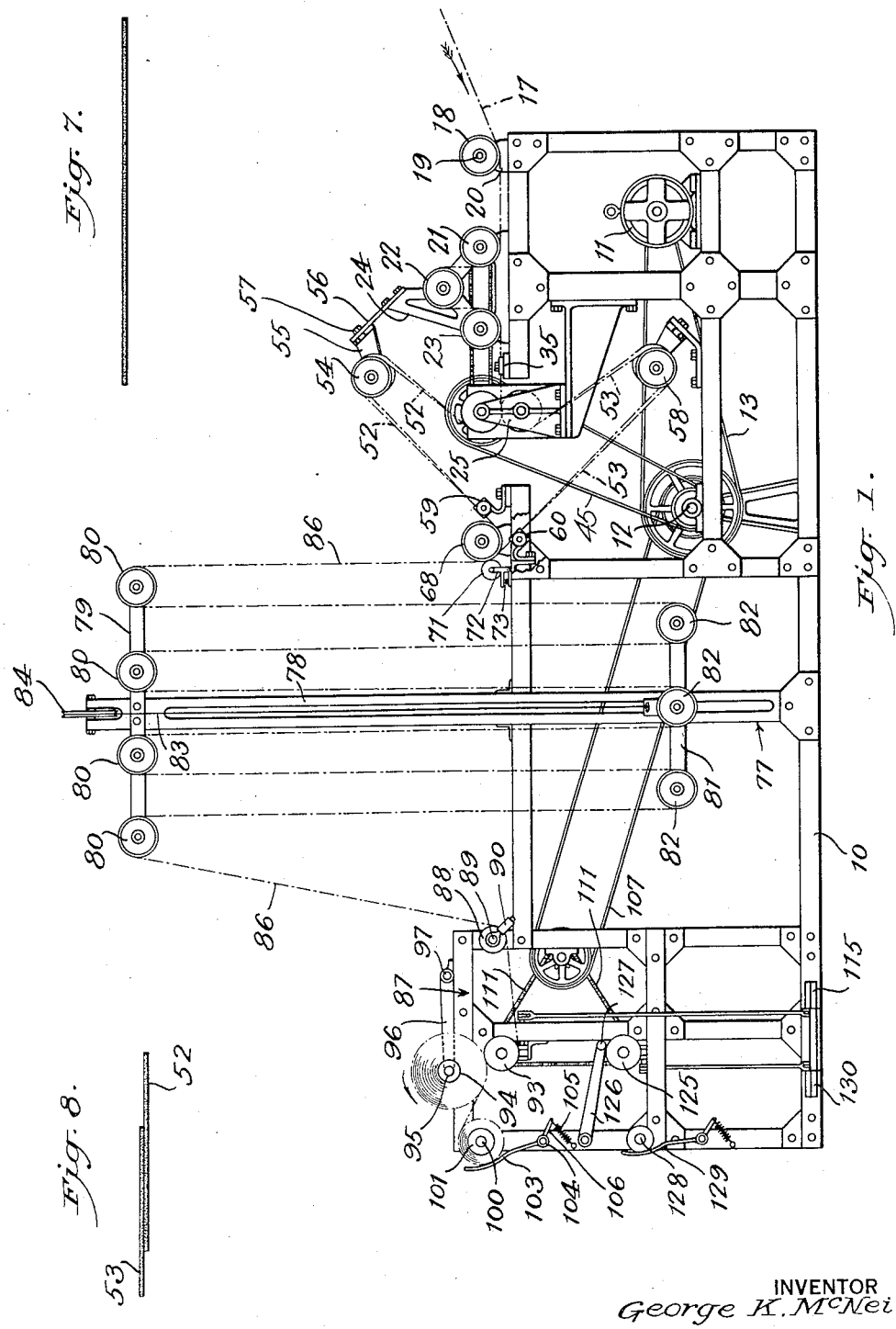
INVENTOR
George K. McNeill
BY
Ernest Hopkins
ATTORNEY

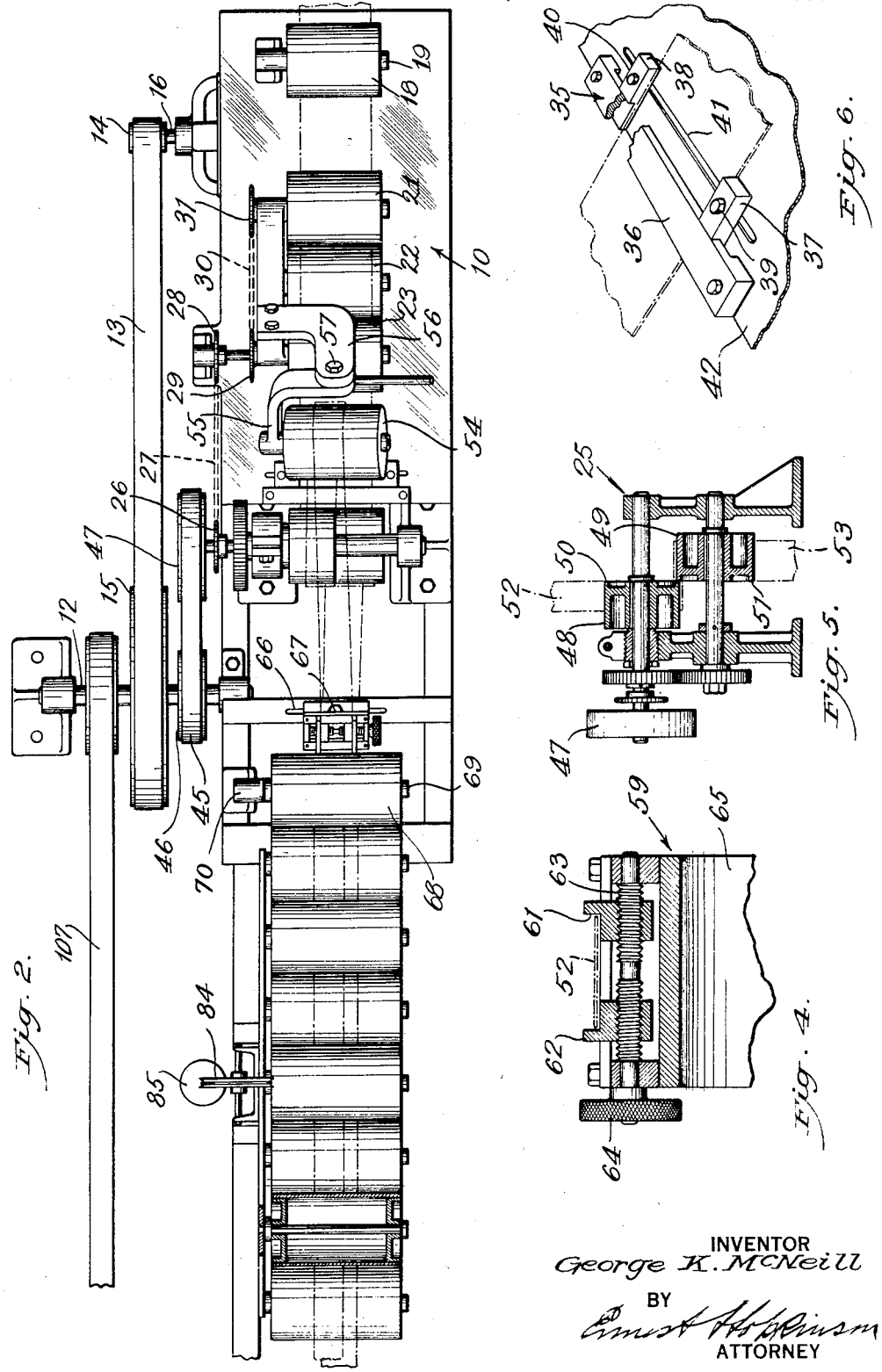

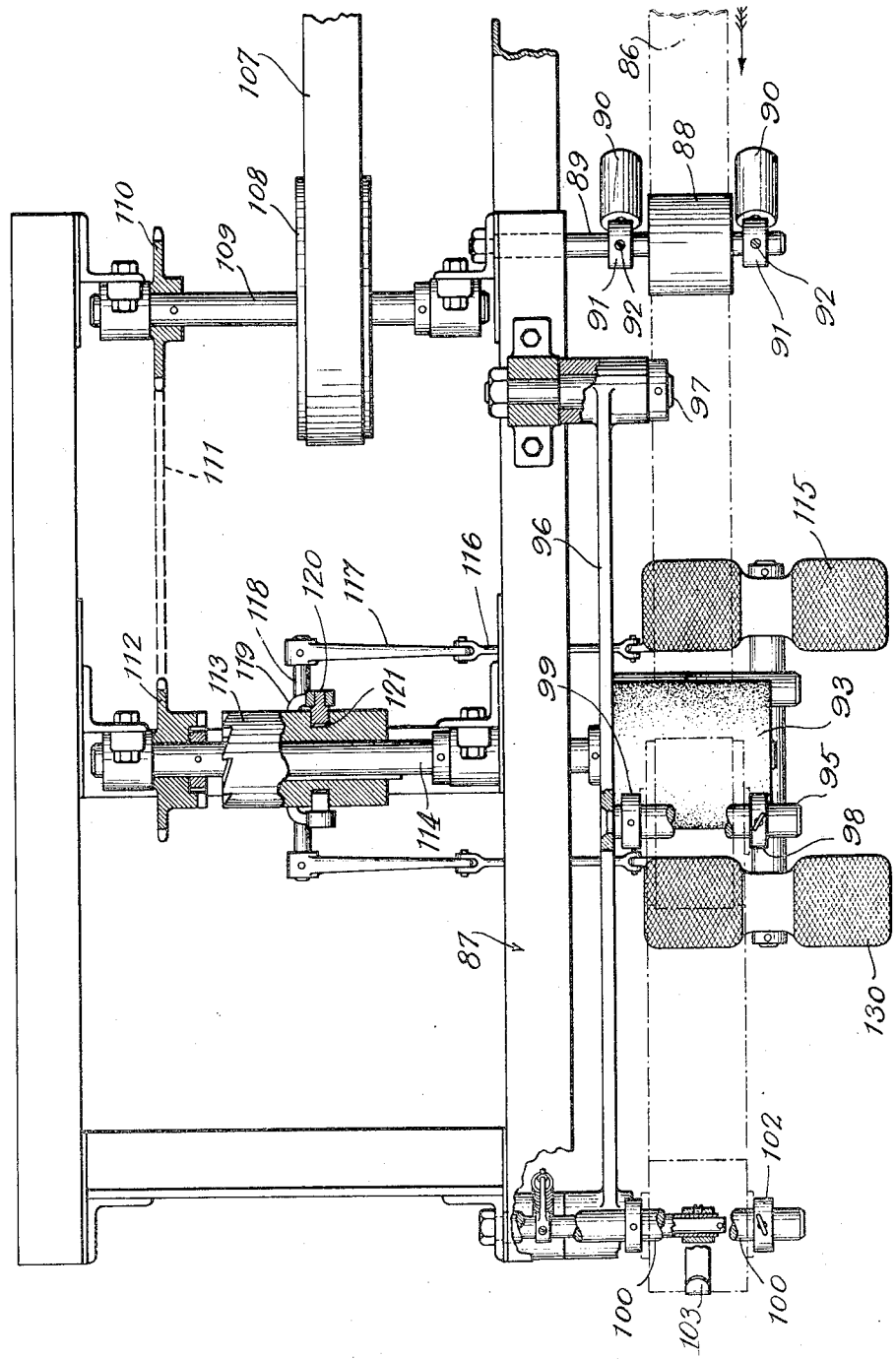

Patented Feb. 20, 1934

1,948,000

UNITED STATES PATENT OFFICE 1,948,000

APPARATUS FOR CUTTING AND ASSEMBLING PLIES

George K. McNeill, Detroit, Mich., assignor to Morgan & Wright, Detroit, Mich., a corporation of Michigan Application March 13, 1928. Serial No. 261,198

3 Claims. (Cl. 154—1)

This invention relates to machinery for the building of pneumatic tires but more particularly to apparatus for slitting and plying tire stocks.

In the manufacture of tires it is usually customary to cut the fabric to the proper width on a bias shear, thus forming a series of lengths, splicing these lengths end to end to form a continuous strip and winding the stock on spools with a strip of cloth known as a liner separating the adjacent layers. The bias shear is then adjusted to cut a second strip of fabric which is of different width than the first and this is spliced and wound in the same manner. The two rolls of different width fabric are then placed on spindles and unwound over suitable guides on to a third spool which completes the operation of superposing them.

The primary object of the present invention is to provide a simple apparatus for carrying out the cycle of operations outlined above with a very material saving in time and manual labor and likewise in the cost of materials. The many other objects and advantages of the invention will be better understood by reference to the following specification when considered in connection with the accompanying drawings illustrating a selected embodiment thereof in which:

Fig. 1 is a side elevation of the complete apparatus;

Fig. 2 is an enlarged plan view of the slitting and plying mechanism;

Fig. 3 is an enlarged plan view of the winding mechanism;

Fig. 4 is an enlarged detailed sectional view of the mechanism for guiding the stock before it is plied;

Fig. 5 is an enlarged detailed sectional view of the slitting mechanism;

Fig. 6 is an enlarged detailed perspective view of the mechanism for guiding the stock preceding the slitting of the same by the slitting mechanism;

Fig. 7 is an enlarged cross section of the strip of stock as it enters the machine; and Fig. 8 is an enlarged cross section of the stock after it has passed through the cycle of operations performed by the apparatus.

Referring to the drawings, the various elements of the apparatus are mounted upon a suitable frame 10. The apparatus may be driven from any suitable source of power but in the present invention this consists of a motor 11 which operates a counter shaft 12 through the medium of a belt 13 and pulleys 14 and 15 respectively mounted on the motor shaft 16 and the counter shaft.

The rubberized fabric 17 as it enters the apparatus at the extreme right as viewed in Fig. 1, has previously been bias cut into a series of lengths having a width equal to the total width of the two finished strips and these lengths have been spliced end to end to form one continuous strip. This strip first passes under a roll 18 on a stud shaft 19 supported by bracket 20 on the frame 10. A series of rolls 21, 22 and 23 supported by the bracket 24 provides a means of automatically feeding the stock to the slitting mechanism 25. This is accomplished by arranging the rolls in a triangular form, the lower rolls 21 and 23 being positively driven from the slitting mechanism by the sprockets and chains 26, 27, 28, 29, 30 and 31 (Fig. 2). The third roll 22 is horizontally disposed above the rolls 21 and 23 and parallel thereto, permitting the stock which is fed under the roll 21, over the roll 22 and under the roll 23 to contact with the rolls 21 and 23 for a distance not greater than one-quarter of their respective circumferences. The peripheral speed of the driven rolls 21 and 23 is slightly greater than that of the slitting device thereby presenting a tendency to become loose between the roll 23 and the slitting mechanism, in which case the fabric will lower by gravity away from the rolls 21 and 23 and thus cause the feeding of the strip to cease until the fabric again becomes sufficiently tight to enable the rolls 21 and 23 to again come into contact with the strip and advance the same.

The strip of fabric upon leaving the roll 23 passes through a guide 35 which is mounted on the frame 10 in front of the slitting mechanism and shown in detail in Fig. 6. This guide 35 consists of a top guide 36 and adjustable side guides 37 and 38. This guide 35 determines the relative widths of the strips to be cut by the slitting device. The side guides 37 and 38 are secured in their adjusted position by means of corresponding bolts 39 and 40 which pass through slot 41 in the top plate 42 of the frame. The proper adjustment of these side guides is obtained by loosening the bolts, sliding the guides longitudinally of the slot 41 in the desired direction and then securing them in their adjusted position by tightening the bolts. The adjustability of the guide 35 not only permits the spacing of the guides to be varied for different widths of strip but it enables the strip to be shifted laterally relative to the cutting blades in the slitting device so that after the strip is longitudinally slitted the two strips thus formed may be of equal width or one may be wider than the other, the latter being usually the case.

The slitting mechanism may be of any suitable type but preferably should slit the fabric by a continuous cut. The slitting mechanism in the present embodiment is driven from the counter shaft 12 through the medium of a belt 45 and pulleys 46 and 47. A transverse vertical section of this mechanism is shown in Fig. 5 and the cutting action is provided by rotary cutters 48 and 49 having coacting cutting edges in cylindrical form designated respectively 50 and 51. The slitting mechanism divides the strip 17 into two strips 52 and 53, the position of the line of cut being determined by adjustment of the guide 35 in the manner described. From the cutting mechanism the strip 52 passes upwardly over a guide roll 54 on a bracket 55 pivotally mounted on an arm 56 attached to the bracket 24. The pivotal connection of the bracket 55 with the arm 56 enables the angle of the roll to be changed and permits the stock to be centrally aligned. When properly adjusted the bracket 55 is rigidly held in position by tightening the screw 57 which forms the pivotal connection. The strip 53 passes downwardly from the slitting device around a guide roll 58 similar in construction and mounting to the roll 54. The strips 52 and 53 then pass over corresponding guides 59 and 60 which are the same in construction and mode of adjustment. One of these guides is shown in detail in Fig. 4. By reference to this figure it will be seen that the guide consists of edge guiding members 61 and 62 which are adjusted for the particular width of the strip by means of the screw 63 operated by a hand wheel 64. A slot as 66 in the frame 10 enables the entire guide 59 to be bodily shifted laterally in order to obtain the desired overlapping of the plies, the guide bracket 65 being secured to the frame by a bolt 67 which passes through the slot and is moved longitudinally thereof.

After travelling over the guides 59 and 60, the strips 52 and 53 pass under and around the plying roll 68 which is mounted on a stud shaft 69 on the bracket 70. This causes the strips to be plied in the manner indicated in Fig. 8, the amount of overlap being determined by the guides 59 and 60. The tacky surface of the strips causes them to readily adhere to each other and this adhesion is assured by a disc or roll 71 which is revolubly mounted on a pivoted arm 72 and yieldingly pressed against the strips and roll 68 by the action of a spring 73.

In order to provide means for momentarily storing the stock without stopping the machine while spools in the winding mechanism are being changed, a take-up mechanism 77 is provided. This consists in the present embodiment of a vertical slotted structural member 78 having at its upper end a horizontal bar 79 supporting a series of rolls 80. A lower bar 81 also supporting a series of rolls designated as 82 is fastened to a block locked within the slot of the structural member 78 and slidable therein. A cable or wire 83 is connected to this block and passes upwardly over a pulley 84. The opposite end of the wire 83 is attached to a counterweight 85 which acts to counter-balance the lower series of rolls sufficiently to that if the plied strip 86 is being supplied by the plying mechanism more rapidly than it is being taken by the winding mechanism 87, the rolls 82 will gradually be lowered and take up the slack. On the other hand, if the winding mechanism operates more rapidly than the stock is being plied the rolls 82 will be drawn upwardly. Therefore, when the winding is stopped to permit the advancing plied strip to be shifted from one wind-up spool to another, the excess supplied by the plying mechanism will be cared for by the take-up mechanism.

The plied strip 86 upon leaving the take-up mechanism 77 enters the winding mechanism 87 in the manner indicated in Fig. 1, passing under the roll 88 on the roll shaft 89 supported by the frame 10. Guide rolls 90 are likewise mounted on this shaft 89 on oposite sides of the roll 88 and the position of these guide rolls may be adjusted by means of the sleeves 91 which connect them to the shaft. Set screws 92 permit the guide rolls to be locked in their adjusted position.

The plied strip next passes under drive roll 93 and then to the wind-up spool 94. This wind-up spool is mounted on a projecting shaft 95 on arm 96 pivotally mounted on the frame 10 at 97. The spool is positioned and retained on the shaft by thumb screw collar 98, the inner end of the spool being held thereby against the fixed collar 99. A suspended spindle 100 carries a roll 101 of liner cloth retained thereon, the roll being retained thereon by thumb screw collar 102. The liner roll is held under tension by means of a bar 103 pivoted on the frame 10 at 104 and yieldingly pressed against the roll by spring 105 connected to the arm 106.

The drive roll 93 is actuated from the counter shaft 12 through the medium of the belt 107, pulley 108, shaft 109, sprocket 110, chain 111, sprocket 112, clutch 113, and shaft 114, the roll 93 being mounted on this shaft 114. The sprocket 112 is normally free upon the shaft 114 and is adapted to be engaged therewith by the keyed clutch 113 which is moved longitudinally of the shaft 114 into and out of engagement by means of the foot pedal 115 connected thereto by link 116, arm 117, shaft 118, and arm 119, the outer end of the arm 119 carrying a pin 120 which enters a corresponding socket 121 in the clutch member 113.

The drive roll 93 causes the winding spool to be rotated in the direction indicated by the arrow in Fig. 1 by frictional contact with the plied fabric on the spool, the weight of the spool and fabric resting on the drive roll. The spool is free to move away from the drive roll as the amount of wound fabric on the spool increases, due to the pivoted arm 96.

In order to permit the winding to proceed without material interruption a second drive roll 125, corresponding to the drive roll 93 is provided on the frame 10 and this is like-wise operated by the chain 111. A pivoted arm 126 carries a shaft 127, corresponding to the shaft 95 on the arm 96 to receive a wind-up spool. A spindle 128, corresponding to the spindle 100, is adapted to receive a liner spool. Tension mechanism 129 is in the same manner provided. The roll 125 is controlled by a foot pedal 130 in the same manner as the roll 93 was controlled by the pedal 115 and these rolls 93 and 125 are preferably coated with soft rubber to provide greater driving resistance.

In the operation of the device, the strip of bias cut fabric 17 passes under the guide roll 18 through the automatically controlled feeding mechanism to the slitting mechanism 25 where it is longitudinally divided into two strips of equal or different width depending on the adjustment of the guide 35 relative to the slitting cutters in such mechanism. The two strips 52 and 53 severed by the slitting mechanism then pass over angularly disposed rolls 54 and 58 and are brought into superimposed position upon the roll 68, the overlap being determined by the guides 59 and 60. This roll 68 together with the pressure roll 71 causes the two plies to be firmly united. After leaving the roll 68 the plied stock passes through a take-up mechanism which is provided to momentarily store the stock while the wind-up spools are being changed. From the take-up mechanism the plied strip 86 passes to the wind-up mechanism 87 where it is wound upon one of the spools provided for the purpose. Liner cloth is started by hand under and around the wind-up spool so that as the stock is fed to the spool a layer of cloth is interposed between the convolutions of the plied stock to prevent adhesion between adjacent layers. As soon as one spool is filled, as for example the spool on the shaft 95, the stock is cut and the new end immediately started on the winding spool on the shaft 127, this winding unit having previously been provided with an empty spool and a new roll of liner cloth. This shifting from one spool to another is quickly done and a new spool and roll of liner cloth can now be placed in the upper unit to again receive the stock as soon as the spool in the lower unit is filled.

From the foregoing description it will be seen that the machine is capable of slitting and plying tire fabric stock and winding the same on spools at the continuous speed of the machine and of the bias shear with which it operates. After the machine is once started with the guides adjusted for the particular stock required, no manual labor is required except to transfer the advancing plied strip from one winding spool to another as rapidly as the spools are filled. The machine operates smoothly and continuously and a uniform product is obtained. The construction is simple and not liable to get out of order and the same machine may be used for cutting and plying strips of any width within the range required by the tire building. The adjustments of the guides may be easily made and these will remain in their adjusted position until readjusted by the operator for a different tire stock.

I am aware that the form and arrangement of parts of the machine may be materially changed without departing from the spirit of my invention and I reserve the right to make all such as fairly fall within the scope of the following claims.

Having thus described my invention, what I claim and desire to protect by Letters Patent is:

1. In apparatus for manufacturing pneumatic tires, mechanism for longitudinally slitting a strip of bias cut fabric to form a plurality of strips of narrower width, and means movable laterally of said slitting mechanism for guiding the strip as it enters said slitting mechanism to determine the widths of said narrower strips.

2. In apparatus for manufacturing pneumatic tires, mechanism for longitudinally slitting a continuous strip of bias cut fabric to form a plurality of strips of narrower width, and mechanism for plying said narrower strips including a plying roll about which said narrower strips pass in superimposed relation, and means for laterally shifting the strips as they approach said plying roll to provide a predetermined overlapping thereof.

3. In apparatus for manufacturing pneumatic tires, mechanism for longitudinally slitting a strip of fabric to form a plurality of strips of narrower width, and mechanism for plying said strips including a plying roll about which the strips are drawn, means including adjustably mounted rolls for guiding the individual strips to said plying roll to determine the relative position thereof in the plied stock, and a stitching roll coacting with said plying roll.

GEORGE K. McNEILL.